United States Patent
Zhou

(10) Patent No.: US 10,861,376 B2
(45) Date of Patent: Dec. 8, 2020

(54) STATE CONTROL METHOD AND DEVICE FOR DISPLAY SCREEN, STORAGE MEDIUM AND ELECTRONIC DEVICE

(71) Applicant: GUANGDONG OPPO MOBILE TELECOMMUNICATIONS CORP., LTD., Guangdong (CN)

(72) Inventor: Yibao Zhou, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 0 days.

(21) Appl. No.: 16/484,030

(22) PCT Filed: Jan. 11, 2018

(86) PCT No.: PCT/CN2018/072295
§ 371 (c)(1),
(2) Date: Aug. 6, 2019

(87) PCT Pub. No.: WO2018/145555
PCT Pub. Date: Aug. 16, 2018

(65) Prior Publication Data
US 2020/0090577 A1  Mar. 19, 2020

(30) Foreign Application Priority Data
Feb. 8, 2017  (CN) .......................... 2017 1 0069616

(51) Int. Cl.
*G09G 5/02* (2006.01)
*G09G 3/22* (2006.01)
(Continued)

(52) U.S. Cl.
CPC ............. *G09G 3/22* (2013.01); *G06F 1/1626* (2013.01); *G06F 3/0484* (2013.01); *H05B 47/11* (2020.01); *G09G 2330/027* (2013.01)

(58) Field of Classification Search
CPC .... G09G 3/22; G09G 2330/027; H05B 47/11; G06F 1/1626; G06F 3/0484;
(Continued)

(56) References Cited

U.S. PATENT DOCUMENTS

2007/0085157 A1  4/2007 Fadell et al.
2008/0122803 A1* 5/2008 Izadi ..................... G06F 3/0421
345/175
(Continued)

FOREIGN PATENT DOCUMENTS

CN  102301684 A  12/2011
CN  102665008 A  9/2012
(Continued)

OTHER PUBLICATIONS

International Search Report (ISR) and Written Opinion (WO) dated Mar. 27, 2018 for Application No. PCT/CN2018/072295.
(Continued)

*Primary Examiner* — Adam R. Giesy
(74) *Attorney, Agent, or Firm* — Ladas & Parry LLP

(57) ABSTRACT

The disclosure provides a state control method for a display screen, which includes that: a current state of a display screen is acquired; a corresponding signal transmitter in a first signal transmitter and a second signal transmitter is controlled according to the current state to transmit a detection signal, wherein the detection signal is reflected by a barrier to form a reflected signal; a distance state between a terminal and the barrier is judged according to an intensity of the reflected signal received by a signal receiver; and the state of the display screen is controlled according to the distance state.

20 Claims, 8 Drawing Sheets

(51) Int. Cl.
*H05B 47/11* (2020.01)
*G06F 1/16* (2006.01)
*G06F 3/0484* (2013.01)

(58) Field of Classification Search
CPC ........ G06F 2203/04101; G06F 3/0487; H04M 1/72522; H04M 1/72569
See application file for complete search history.

(56) References Cited

U.S. PATENT DOCUMENTS

2013/0341494 A1* 12/2013 Fadell .................. G06F 3/0383
250/214 AL
2014/0146640 A1 5/2014 Matsuoka
2015/0355371 A1* 12/2015 Ableitner ................ F24F 11/30
236/1 C

FOREIGN PATENT DOCUMENTS

| | | | |
|---|---|---|---|
| CN | 102790827 | A | 11/2012 |
| CN | 102883061 | A | 1/2013 |
| CN | 102917124 | A | 2/2013 |
| CN | 103024197 | A | 4/2013 |
| CN | 202931411 | U | 5/2013 |
| CN | 103369142 | A | 10/2013 |
| CN | 103516889 | A | 1/2014 |
| CN | 104618565 | A | 5/2015 |
| CN | 104811547 | A | 7/2015 |
| CN | 104935749 | A | 9/2015 |
| CN | 105407191 | A | 3/2016 |
| CN | 105511657 | A | 4/2016 |
| CN | 103777818 | B | 8/2016 |
| CN | 105979066 | A | 9/2016 |
| CN | 106020423 | A | 10/2016 |
| CN | 106210356 | A | 12/2016 |
| CN | 106375606 | A | 2/2017 |
| CN | 106850989 | A | 6/2017 |
| JP | 2006094485 | A | 4/2006 |
| JP | 2012248974 | A | 12/2012 |

OTHER PUBLICATIONS

The extended European search report for the EP patent application No. 18750825.4, dated Dec. 11, 2019.
The first office action for the Chinese patent application No. 201880005644.6, dated May 8, 2020.
The first office action for the Chinese patent application No. 201710069616.8, dated Mar. 4, 2019.

* cited by examiner

STATE CONTROL METHOD AND DEVICE FOR DISPLAY SCREEN, STORAGE MEDIUM AND ELECTRONIC DEVICE

CROSS-REFERENCE TO RELATED APPLICATIONS

The present application is a national stage application of International Patent Application No. PCT/CN2018/072295, which is filed on Jan. 11, 2018 and claims priority to Chinese Patent Application No. 201710069616.8, filed on Feb. 8, 2017 and entitled "State Control Method and Device for Display Screen", the contents of which are hereby incorporated by reference in its entirety.

TECHNICAL FIELD

The disclosure relates to the field of communications, and particularly to a state control method and device for a display screen, a storage medium and an electronic device.

BACKGROUND

Along with rapid development of terminal technologies, intelligent terminals get increasingly popular and become indispensable devices in people's lives. A user may adopt an intelligent terminal for study, entertainment and the like.

At present, an intelligent terminal is required to have a function of controlling a screen of the intelligent terminal to be turned on or turned off based on judgement of a close or distant state between the intelligent terminal and an external object. The intelligent terminal usually detects the near state or distant state between the intelligent terminal and the external object by use of an infrared transmitter and an infrared receiver. An infrared ray is transmitted by the infrared transmitter, and is reflected by a barrier to form a reflected ray. The infrared receiver, after receiving the reflected ray, judges whether the intelligent terminal is close to or distant from the barrier according to an intensity value of the infrared ray.

SUMMARY

The Technical Problem

A terminal cannot accurately control a state of a display screen.

Technical Solution

Embodiments of the disclosure provide a state control method and device for a display screen, a storage medium and an electronic device, which may improve accuracy of control over a state of a display screen of a terminal.

The embodiments of the disclosure provide a state control method for a display screen, which may be applied to a terminal. The terminal is provided with a first signal transmitter, a second signal transmitter and a signal receiver, and a distance between the second signal transmitter and the signal receiver is longer than a distance between the first signal transmitter and the signal receiver. The state control method includes the following operations:

a current state of a display screen is acquired;

a corresponding signal transmitter in the first signal transmitter and the second signal transmitter is controlled according to the current state to transmit a detection signal, wherein the detection signal is reflected by a barrier to form a reflected signal;

a distance state between the terminal and the barrier is judged according to an intensity of the reflected signal received by the signal receiver; and the state of the display screen is controlled according to the distance state.

The embodiments of the disclosure provide a state control device for a display screen, which may be applied to a terminal. The terminal is provided with a first signal transmitter, a second signal transmitter and a signal receiver, and a distance between the second signal transmitter and the signal receiver is longer than a distance between the first signal transmitter and the signal receiver. The state control device includes:

an acquisition module, configured to acquire a current state of a display screen;

a transmission module, configured to control, according to the current state, a corresponding signal transmitter in the first signal transmitter and the second signal transmitter to transmit a detection signal, wherein the detection signal is reflected by a barrier to form a reflected signal;

a judgment module, configured to judge a distance state between the terminal and the barrier according to an intensity of the reflected signal received by the signal receiver; and a control module, configured to control the state of the display screen according to the distance state.

The embodiments of the disclosure provide a storage medium, in which a computer program may be stored, the computer program being executed on a computer to enable the computer to execute the operations in the state control method for the display screen provided in the embodiments.

The embodiments of the disclosure provide an electronic device, which may include a memory and a processor and may be provided with a first signal transmitter, a second signal transmitter and a signal receiver, wherein a distance between the second signal transmitter and the signal receiver is longer than a distance between the first signal transmitter and the signal receiver. The processor calls a computer program stored in the memory to execute the following operations:

a current state of a display screen is acquired;

a corresponding signal transmitter in the first signal transmitter and the second signal transmitter is controlled according to the current state to transmit a detection signal, wherein the detection signal is reflected by a barrier to form a reflected signal;

a distance state between the electronic device and the barrier is judged according to an intensity of the reflected signal received by the signal receiver; and the state of the display screen is controlled according to the distance state.

Beneficial Effect

According to the state control method and device for a display screen, the storage medium and the electronic device provided in the embodiments of the disclosure, the current state of the display screen is acquired; the corresponding signal transmitter in the first signal transmitter and the second signal transmitter is controlled according to the current state to transmit the detection signal, wherein the detection signal is reflected by the barrier to form the reflected signal; the distance state between the terminal and the barrier is judged according to the intensity of the reflected signal received by the signal receiver; and the state of the display screen is controlled according to the distance state, thereby completing control over the state of the display screen. According to the solution, the signal transmitter corresponding to the current state of the display screen may be turned on to transmit the detection signal, so that accuracy of control over the state of the display screen of the terminal may be improved.

DETAILED DESCRIPTION OF THE EMBODIMENTS

Figure 1:
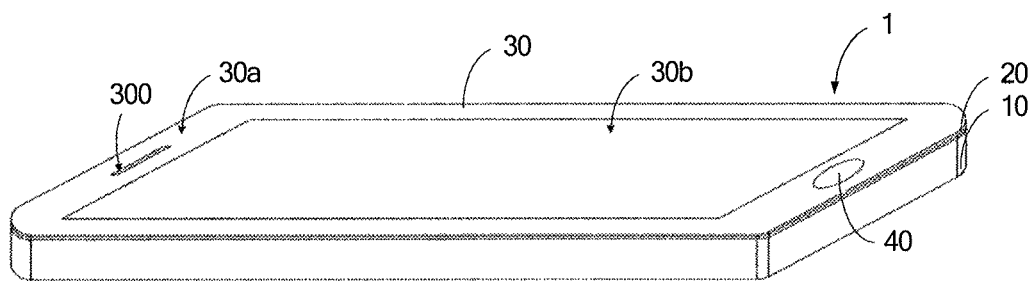
FIG. 1 is a structure diagram of a mobile terminal according to an embodiment of the disclosure.

The implementation modes of the disclosure will be described below in detail. Examples of the implementation modes are shown in the drawings throughout which the same or similar sign numbers represent the same or similar components or components with the same or similar functions. The implementation modes are exemplarily described below with reference to the drawings and only adopted to explain the disclosure and should not be understood as limits to the disclosure.

In the description of the disclosure, it is to be understood that directions or position relations indicated by "center", "longitudinal", "transverse", "length", "width", "thickness", "up", "down", "front", "rear", "left", "right", "vertical", "horizontal", "top", "bottom", "inside", "outside", "clockwise", "anticlockwise" and the like are directions or position relations shown on the basis of the drawings, and are only to facilitate and simplify the description of the disclosure instead of indicating or implying that indicated devices or components have specific directions and be constructed and operated at the specific directions, so that these terms may not be understood as limitations to the disclosure. In addition, terms "first" and "second" are only for description, but not understood as indicating or implying relative importance or implicitly indicating the number of indicated technical features. Therefore, features defined by "first" and "second" may explicitly indicate or implicitly include one or more features. In the description of the disclosure, unless otherwise specifically specified, term "multiple" means that the number is equal to or more than 2.

In the description of the disclosure, it is to be noted that, unless otherwise clearly specified and defined, terms "mounting", "connected" and "connecting" shall be generally understood. For example, it may be fixed connection, and also may be detachable connection, or integrated connection. It may be mechanical connection, and also may be electric connection or may be intercommunication. It may be direct connection, and also may be indirect connection through an intermediate. It may be communication of insides of two elements or an interaction relation of the two elements. Those of ordinary skill in the art can understand specific meanings of the foregoing terms in the disclosure according to specific situations.

In the disclosure, unless otherwise clearly specified and defined, a situation that a first feature is "above" or "below" a second feature may include direct contact of the first and second features, or may also include that the first and second features indirectly contact via an intermediate therebetween rather than directly contacting. In addition, a situation that the first feature is "on", "above" and "on the upside of" the second feature may be that the first feature is right above and in the oblique above the second feature, or only represents that the horizontal height of the first feature is greater than that of the second feature. A situation that the first feature is "under", "below" and "underneath" the second feature may be that the first feature is right below and in the oblique below the second feature, or only represents that the horizontal height of the first feature is less than that of the second feature.

Many different implementation modes or examples are provided in the following disclosure to implement different structures of the disclosure. For simplifying the disclosure of the disclosure, components and arrangement in specific examples will be described below. Of course, they are only examples and not intended to limit the disclosure. In addition, reference numbers and/or reference letters may be repeated in different examples in the disclosure for simplification and clear description without indicating relations between each discussed implementation mode and/or setting. Moreover, examples of various specific processes and materials are provided in the disclosure, but those of ordinary skill in the art may realize application of other processes and/or use of other materials.

Referring to FIG. 1, FIG. 1 is a structure diagram of a mobile terminal 1 according to an embodiment of the disclosure. The mobile terminal 1 may be an electronic device such as a mobile phone or an IPAD. The mobile terminal 1 includes a shell 10, a panel 20 and a cover plate component 30.

The shell 10 forms an external contour of the mobile terminal 1 and is configured to mount other components.

The panel 20 may be a display panel, a touch display panel or the like.

Figure 2:
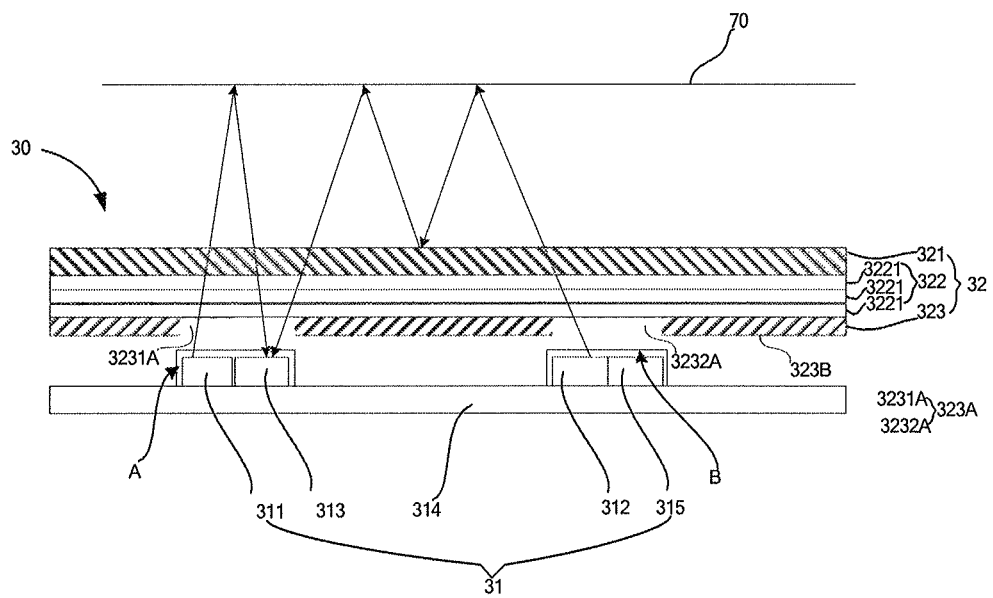
FIG. 2 is a structure diagram of a cover plate component according to an embodiment of the disclosure.

Referring to FIG. 2 together, the cover plate component 30 includes a sensor component 31 and a cover plate 32. The sensor component 31 is arranged in the shell 10. The panel 20 is arranged on the shell 10 and connected with the shell 10. The cover plate 32 covers the panel 20 to protect the panel 20. The cover plate 32 has a non-display region 30a and a display region 30b. Herein, the non-display region 30a is substantially in white or light color, and part of invisible light and visible light may pass through the non-display region 30a. The display region 30b is transparent such as the mobile terminal 1 presents a picture on the panel 20 to a user through the display region 30b.

In some embodiments, the mobile terminal 1 further includes a receiver component, and correspondingly, a corresponding receiver hole 300 is formed in the cover plate 32.

In some embodiments, the mobile terminal 1 further includes a fingerprint module 40 for the user to input fingerprint information of the user.

Still referring to FIG. 2, the sensor component 31 includes a first signal transmitter 311, a second signal transmitter 312, a first signal receiver 313, a circuit board structure 314 and a first ambient light sensor 315.

Herein, the first signal transmitter 311 and the second signal transmitter 312 may be acoustic signal transmitters and may alternatively be optical signal transmitters. The first signal receiver 313 may be a signal receiver of a corresponding type. The circuit board structure 314 may be a circuit board and, in the embodiment, is a main board of the mobile terminal 1. All of the first signal transmitter 311, the second signal transmitter 312 and the first signal receiver 313 are arranged on the circuit board structure 314. All of the first signal transmitter 311, the second signal transmitter 312 and the first signal receiver 313 are electrically connected with the circuit board structure 314. A distance between the first signal transmitter 311 and the first signal receiver 313 is shorter than a distance between the second signal transmitter 312 and the first signal receiver 313. It can be understood that the circuit board structure 314 may be a structure parallel to the sensor component 31 rather than a component included in the sensor component 31.

Herein, the first signal transmitter 311 is configured to transmit invisible light of which a wavelength is greater than 850 nm as a first signal, for example, infrared light. The first signal transmitter 311 may be an infrared transmitter. The first signal transmitted by the first signal transmitter 311 is reflected by a barrier 70 to form a first reflected signal.

The second signal transmitter 312 is configured to transmit invisible light of which a wavelength is greater than 850 nm as a second signal, for example, infrared light. The second signal transmitter 312 may be an infrared transmitter. The second signal transmitted by the second signal transmitter 312 is reflected by the barrier 70 to form a second reflected signal.

The first signal receiver 313 is configured to receive the first reflected signal and the second reflected signal and convert the first reflected signal and the second reflected signal into electric signals, and the circuit board structure 314 analyzes the electric signals to judge whether the mobile terminal 1 is close to or distant from the barrier 70.

The first ambient light sensor 315 is configured to detect brightness of ambient light, and the mobile terminal 1 performs adaptive control or regulation according to the brightness, for example, the mobile terminal 1 regulates display brightness of the panel 20 according to the ambient brightness.

In some embodiments, the first signal transmitter 311 is arranged close to the first signal receiver 313, and the second signal transmitter 312 is arranged distant from the first signal receiver 313. For example, the first signal transmitter 311 and the first signal receiver 313 may be integrally packaged into a first package A. The first package is spaced from the second signal transmitter 312. The first ambient light sensor 315 and the second signal transmitter 312 may be packaged together, thereby forming a second package B. Herein, a distance between the first package A and the second signal transmitter 312 is 2 millimeters to 12 millimeters, and the distance refers to a distance between geometric centers of the first package A and the second signal transmitter 312.

Figure 3:
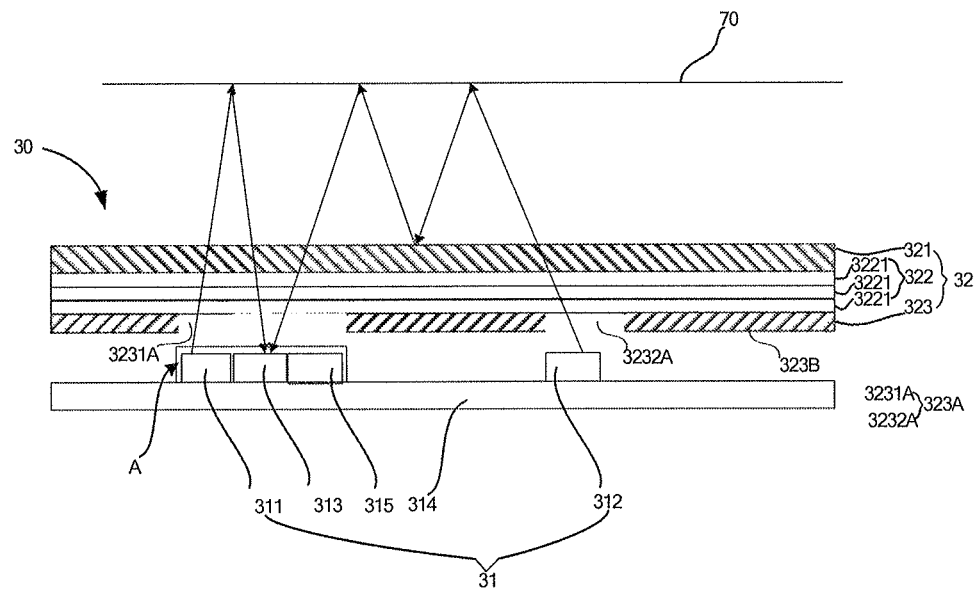
FIG. 3 is another structure diagram of a cover plate component according to an embodiment of the disclosure.

It can be understood that, for example, as shown in FIG. 3, the first ambient light sensor 315 may alternatively be packaged together with the first signal transmitter 311 and the first signal receiver 313 in the first package A.

Still referring to FIG. 2, the cover plate 32 includes a cover plate body 321, a first attachment layer 322 and a second attachment layer 323. The display region 30b of the cover plate 32 covers a display portion of the panel 20. The cover plate body 321 has an inner surface and an outer surface. The first attachment layer 322 is arranged on the surface, facing the sensor component 31, of the cover plate body 321 and positioned in the non-display region 30a, namely on the inner surface of the cover plate body 321. The second attachment layer 323 is arranged on the first attachment layer 322.

The cover plate body 321 is made of a transparent material. For example, the cover plate body 321 is a glass cover plate. The cover plate body 321 may also be a glass cover plate made from a material such as a sapphire. The first attachment layer 322 completely covers the second attachment layer 323. Due to arrangement of the first attachment layer 322 and the second attachment layer 323, the effect of hiding an inner structural component of the mobile terminal 1 and the second attachment layer 323 may further be achieved. That is, the user, when observing from an outer side of the cover plate body 321, may see the first attachment layer 322 only and may not see the second attachment layer 323.

Transmittance of the first attachment layer 322 is higher than transmittance of the second attachment layer 323.

For example, the transmittance of the first attachment layer 322 may be 80% or over 80%, and the transmittance of the second attachment layer 323 may be 10% or below 10%. During a practical application, the first attachment layer 322 may be called a transmission layer configured to transmit most of signals; and the second attachment layer 323 may be called a shielding layer configured to shield most of signals.

During the practical application, the second attachment layer 323 is configured to hide an inner structure of the mobile terminal 1 to make it impossible to see the inner structure of the mobile terminal 1 from the outer side of the cover plate body 321 to achieve an effect of providing attractive appearance of the whole mobile terminal 1.

Herein, the first attachment sensor 322 may be a white ink layer, and the second attachment layer 323 may be a black ink layer. Of course, the white ink layer and the black ink layer are only examples, and the first attachment layer 322 and the second attachment layer 323 may alternatively be designed to be other colors according to different requirements on attractive appearance as long as the transmittance of the first attachment layer 322 is higher than the transmittance of the second attachment layer 323. Herein, the white ink layer, the black ink layer or an ink layer in another color may be prepared by a spray-coating or printing process. Herein, the first attachment layer 322 may also be an ink layer in blue, gold, red, pink or another color.

The first attachment layer 322 is multilayer, and the second attachment layer 323 is single-layer or multilayer. For example, the first attachment layer 322 includes three sublayers 3221, and the three sublayers 3221 are sequentially overlapped.

Figure 4:
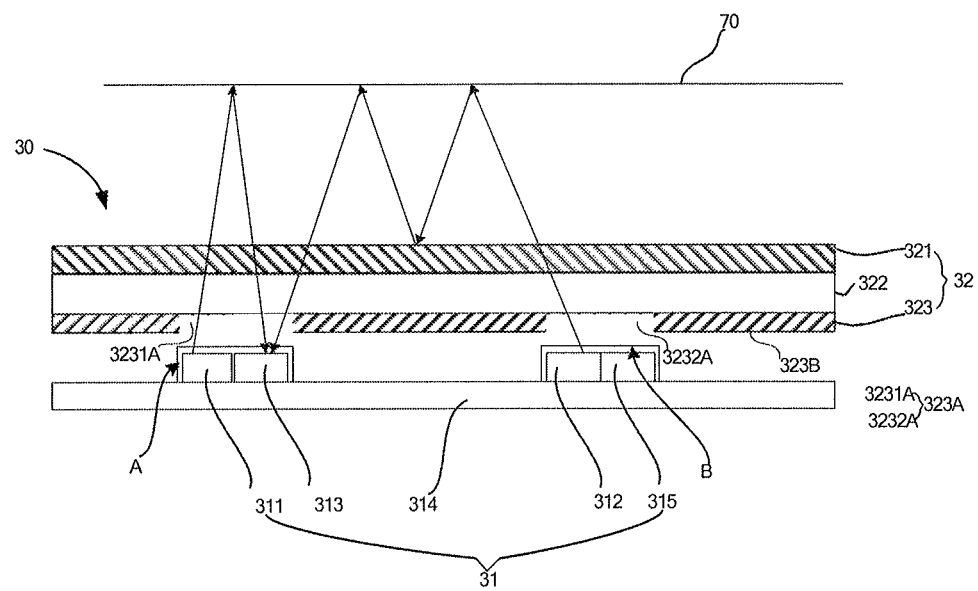
FIG. 4 is another structure diagram of a cover plate component according to an embodiment of the disclosure.

Or, for example, as shown in FIG. 4, the first attachment layer 322 may be single-layer, and the second attachment layer 323 is single-layer.

Still referring to FIG. 2, the second attachment layer 323 and the first attachment layer 321 define a functional region together such that the functional region is hidden on the outer surface of the cover plate body 321. The functional region may be an image acquisition hole, a receiver hole, a proximity sensor hole or an iris recognition hole for a camera element. Or, in the embodiment, the second attachment layer 323 may include a first region 323A and second region 323B, and the first region 323A is the functional region. The first region 323A may be understood as a portion, not overlapped with the first attachment layer 322, of the second attachment layer 323. The second region 323B may be understood as a portion, overlapped with the first attachment layer 322, of the second attachment layer 323. Transmittance of the first region 323A is higher than transmittance of the second region 323B, so that the signal may sequentially pass through the first region 323A, the first attachment layer 322 and the cover plate body 321 and, after being reflected by the external barrier 70, sequentially pass through the cover plate body 321, the first attachment layer 322 and the first region 323A.

Herein, the first attachment layer 322 covers the first region 323A of the second attachment layer 323, so that the first region 323A may not be seen from the outer side of the mobile terminal 1.

In some embodiments, when the second attachment layer 323 is the black ink layer, black ink of the first region 323A may be treated to make the transmittance of this region higher than the transmittance of the second region 323B.

In some embodiments, the first region 323A may be arranged to be a through hole, in such case, the transmittance of this region is 100%, and the first attachment layer 322 covers the through hole. In some embodiments, the through hole of the first region 323A may be filled with a material through which the signal may pass.

In some embodiments, the first region 323A includes a first subregion 3231A and a second subregion 3232A. The first subregion 3231A is opposite to the first signal transmitter 311 and the first signal receiver 313, and the second subregion 3232A is opposite to the second signal transmitter 312 and the first ambient light sensor 315. The first subregion 3231A and the second subregion 3232A are through holes defined by a boundary of the second region 323B respectively.

Figure 5:
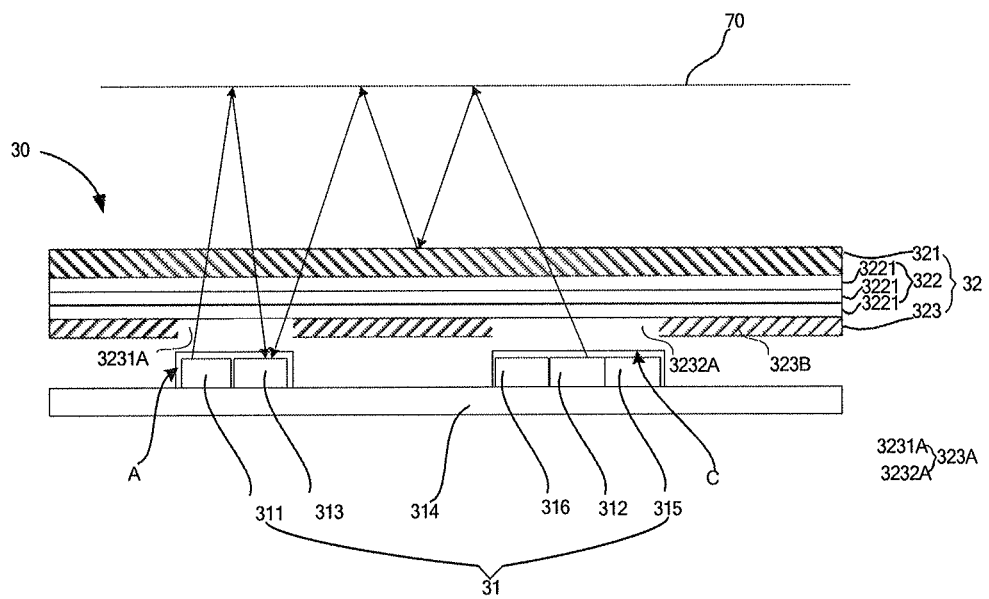
FIG. 5 is another structure diagram of a cover plate component according to an embodiment of the disclosure.

In some other embodiments, as shown in FIG. 5, the sensor component 31 includes a first signal transmitter 311, a second signal transmitter 312, a first signal receiver 313, a circuit board structure 313, a first ambient light sensor 315 and a second signal receiver 316. Herein, the circuit board structure 314 may be a circuit board and, in the embodiment, is a main board of the mobile terminal 1. All of the first signal transmitter 311, the second signal transmitter 312, the first signal receiver 313, the first ambient light sensor 315 and the second signal receiver 316 are arranged on the circuit board structure 314. All of the first signal transmitter 311, the second signal transmitter 312, the first signal receiver 313, the first ambient light sensor 315 and the second signal receiver 316 are electrically connected with the circuit board structure 314. A distance between the first signal transmitter 311 and the first signal receiver 313 is shorter than a distance between the second signal transmitter 312 and the first signal receiver 313. A distance between the second signal receiver 316 and the second signal transmitter 312 is shorter than a distance between the second signal receiver 316 and the first signal transmitter 311.

Herein, the first signal transmitter 311, the second signal transmitter 312, the first signal receiver 313, the circuit board structure 314 and the first ambient light sensor 315 are structurally the same as the corresponding components in the abovementioned embodiment and thus will not be elaborated.

The second signal receiver 316 is configured to receive the first reflected signal and the second reflected signal and convert the first reflected signal and the second reflected signal into electric signals for the circuit board structure 314 to analyze to judge whether the mobile terminal 1 is close to or distant from the barrier 70. Herein, the second signal receiver 316 is mainly configured for use after the first signal receiver 313 is damaged.

The first ambient light sensor 315 is configured to detect brightness of ambient light, and the mobile terminal 1 performs adaptive control or regulation according to the brightness, for example, regulating display brightness of the panel 20 according to ambient brightness.

In some embodiments, the first signal transmitter 311 is arranged close to the first signal receiver 313, and the second signal transmitter 312 is arranged distant from the first signal receiver 313. For example, the first signal transmitter 311 and the first signal receiver 313 may be integrally packaged into a first package A. The first ambient light sensor 315, the second signal transmitter 312 and the second signal receiver 316 may be packaged together, thereby forming a third package C.

Figure 6:
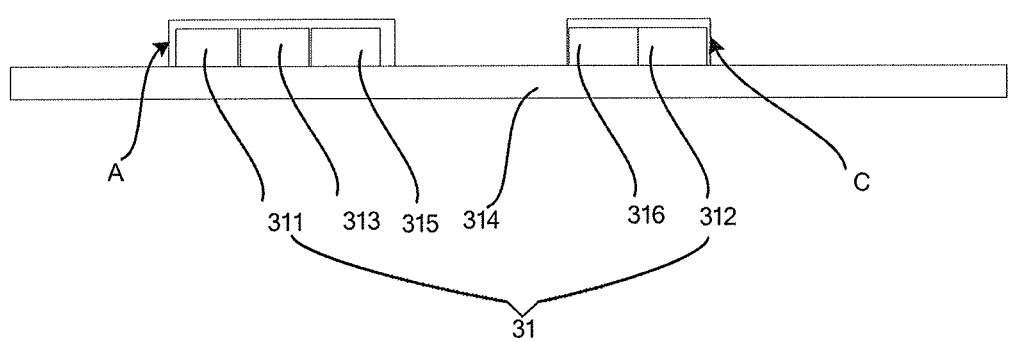
FIG. 6 is another structure diagram of a cover plate component according to an embodiment of the disclosure.

It can be understood that, as shown in FIG. 6, the first ambient light sensor 315 may also be packaged together with the first signal transmitter 311 and the first signal receiver 313 in the first package A.

Still referring to FIG. 5, the cover plate 32 includes a cover plate body 321, a first attachment layer 322 and a second attachment layer 323. The non-display region 30a of the cover plate 32 covers a non-display portion of the panel 20, and the display region 30b of the cover plate 32 covers a display portion of the panel 20. The first attachment layer 322 is arranged on the surface, facing the sensor component 31, of the cover plate body 321 and positioned in the non-display region 30a, and the second attachment layer 323 is arranged on the first attachment layer 322.

The cover plate body 321 is made of a transparent material. For example, the cover plate body 321 is a glass cover plate. The cover plate body 321 may also be a glass cover plate made from a material such as a sapphire. The first attachment layer 322 completely covers the second attachment layer 323. Due to arrangement of the first attachment layer 322 and the second attachment layer 323, the effect of hiding an inner structural component of the mobile terminal 1 and the second attachment layer 323 is achieved. That is, the user, when observing from the outer side of the cover plate body 321, may see the first attachment layer 322 only and may not see the second attachment layer 323.

Transmittance of the first attachment layer 322 is higher than transmittance of the second attachment layer 323.

For example, the transmittance of the first attachment layer 322 may be 80% or over 80%, and the transmittance of the second attachment layer 323 may be 10% or below 10%. During a practical application, the first attachment layer 322 may be called a transmission layer configured to transmit most of signals; and the second attachment layer 323 may be called a shielding layer configured to shield of most of signals.

During the practical application, the second attachment layer 323 is configured to hide an inner structure of the mobile terminal 1 to make it impossible to see the inner structure of the mobile terminal 1 from the outer side of the cover plate body 321 to achieve an effect of attractive appearance of the whole mobile terminal 1.

Herein, the first attachment layer 322 may be a white ink layer, and the second attachment layer 323 may be a black ink layer. Of course, the white ink layer and the black ink layer are only examples, and the first attachment layer 322 and the second attachment layer 323 may also be designed into other colors according to different requirements on attractive appearance as long as the transmittance of the first attachment layer 322 is higher than the transmittance of the second attachment layer 323. Herein, the white ink layer, the black ink layer or an ink layer in another color may be prepared by a spray-coating or printing process.

Herein, the first attachment layer 322 is single-layer, and the second attachment layer 323 is single-layer or multilayer; or, the first attachment layer 322 may be multilayer, and the second attachment layer 323 is single-layer or multilayer. For example, the first attachment layer 322 includes three sublayers 3221, and the three sublayers 3221 are sequentially overlapped.

The second attachment layer 323 may include a first region 323A and a second region 323B. The first region 323A may be understood as a portion, not overlapped with the first attachment layer 322, of the second attachment layer 323. The second region 323B may be understood as a portion, overlapped with the first attachment layer 322, of the second attachment layer 323. Transmittance of the first region 323A is higher than transmittance of the second region 323B, so that the signal may sequentially pass through the first region 323A, the first attachment layer 322 and the cover plate body 321 and, after being reflected by the external barrier 70, sequentially pass through the cover plate body 321, the first attachment layer 322 and the first region 323A.

Herein, the first attachment layer 322 covers the first region 323A of the second attachment layer 323, so that the first region 323A may not be seen from the outer side of the mobile terminal 1.

In some embodiments, when the second attachment layer 323 is the black ink layer, black ink of the first region 323A may be treated to make the transmittance of this region higher than the transmittance of the second region 323B.

In some embodiments, the first region 323A may be arranged to be a through hole, in such case, the transmittance of this region is 100%, and the first attachment layer 322 covers the through hole. In some embodiments, the through hole of the first region 323A may be filled with a material through which the signal may pass.

In some embodiments, the first region 323A includes a first subregion 3231A and a second subregion 3232A. The first subregion 3231A is opposite to the first signal transmitter 311 and the first signal receiver 313, and the second subregion 3232A is opposite to the second signal transmitter 312, the second signal receiver 316 and the first ambient light sensor 315. The first subregion 3231A and the second subregion 3232A are through holes defined by a boundary of the second region 323B respectively.

Compared with the abovementioned embodiment, the embodiment is mainly improved in a manner that the second signal receiver is added, so that the second signal receiver may be adopted instead when the first signal receiver fails.

In a practical using process, if an infrared transmitter is too distant from an infrared receiver, a reflected ray may not enter the infrared receiver when a barrier is relatively close. When the infrared transmitter is too close to the infrared receiver and an intelligent terminal is too distant from the barrier, a base value detected by the infrared receiver may be relatively great because part of an infrared ray transmitted by the infrared transmitter may be directly diffracted in the intelligent terminal and enter the infrared receiver, and moreover, a light intensity detected by the infrared receiver only changes slightly after the reflected ray enters the infrared receiver because the barrier is relatively distant from the infrared receiver. Therefore, the infrared receiver is quite low in sensitivity and high in misjudgment or missed judgment rate, which causes inaccuracy of control over screen turning-off and turning-on of the intelligent terminal.

An embodiment of the disclosure provides a state control method for a display screen, which is applied to a terminal. The terminal is provided with a first signal transmitter, a second signal transmitter and a signal receiver, and a distance between the second signal transmitter and the signal receiver is longer than a distance between the first signal transmitter and the signal receiver. The state control method includes the following operations:

a current state of a display screen is acquired;

a corresponding signal transmitter in the first signal transmitter and the second signal transmitter is controlled according to the current state to transmit a detection signal, wherein the detection signal is reflected by a barrier to form a reflected signal;

a distance state between the terminal and the barrier is judged according to an intensity of the reflected signal received by the signal receiver; and the state of the display screen is controlled according to the distance state.

In an implementation mode, the operation that the corresponding signal transmitter in the first signal transmitter and the second signal transmitter is controlled according to the current state to transmit the detection signal, wherein the detection signal is reflected by the barrier to form the reflected signal, includes that: when the display screen is in an on state, the second signal transmitter is controlled to transmit a first detection signal, wherein the first detection signal is reflected by the barrier to form a first reflected signal.

Correspondingly, the operation that the distance state between the terminal and the barrier is judged according to the intensity of the reflected signal received by the signal receiver includes that: the distance state between the terminal and the barrier is judged according to an intensity of the first reflected signal received by the signal receiver.

In an implementation mode, the operation that the distance state between the terminal and the barrier is judged according to the intensity of the first reflected signal received by the signal receiver includes that: whether the intensity of the first reflected signal received by the signal receiver is greater than a first threshold value or not is judged; and it is determined, in response to detecting that the intensity of the first reflected signal received by the signal receiver is greater than the first threshold value, that the terminal and the barrier are in a near state.

Correspondingly, the operation that the state of the display screen is controlled according to the distance state includes that: the display screen is controlled to be turned off according to the near state.

In an implementation mode, the operation that the corresponding signal transmitter in the first signal transmitter and the second signal transmitter is controlled according to the current state to transmit the detection signal, wherein the detection signal is reflected by the barrier to form the reflected signal, includes that: when the display screen is in an off state, the second signal transmitter is controlled to transmit a second detection signal, and the first signal transmitter is controlled to transmit a third detection signal, wherein the second detection signal is reflected by the barrier to form a second reflected signal and the third detection signal is reflected by the barrier to form a third reflected signal.

Correspondingly, the operation that the distance state between the terminal and the barrier is judged according to the intensity of the reflected signal received by the signal receiver includes that: the distance state between the terminal and the barrier is judged according to intensities of the second reflected signal and the third reflected signal received by the signal receiver.

In an implementation mode, the operation that the distance state between the terminal and the barrier is judged according to the intensities of the second reflected signal and the third reflected signal received by the signal receiver includes that: whether a sum of the intensities of the second reflected signal and the third reflected signal received by the signal receiver is less than a second threshold value or not is judged; and it is determined, in response to detecting that the sum of the intensities of the second reflected signal and the third reflected signal received by the signal receiver is less than the second threshold value, that the terminal and the barrier are in a distant state.

Correspondingly, the operation that the state of the display screen is controlled according to the distance state includes that: the display screen is controlled to be turned on according to the distant state.

In an implementation mode, the state control method further includes that: a numerical value of the first threshold value is set to be 100 in response to detecting that a bit number of the signal receiver is 8.

In an implementation mode, the state control method further includes that: a numerical value of the second threshold value is set to be 75 in response to detecting that a bit number of the signal receiver is 8.

Figure 7:
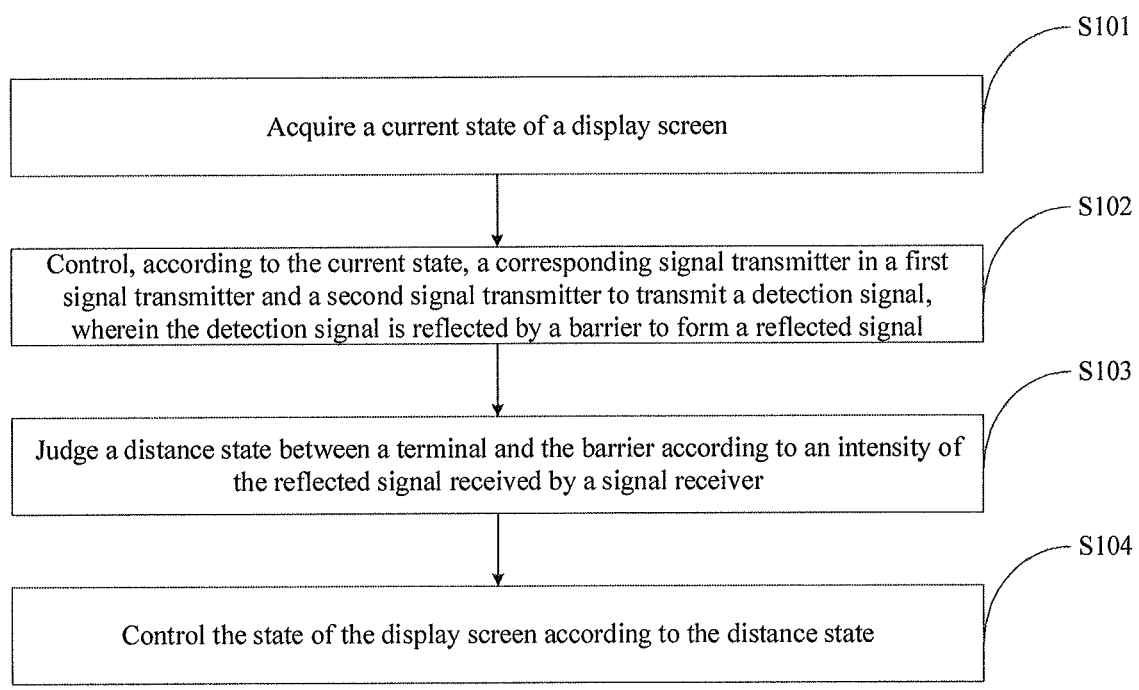
FIG. 7 is a first flowchart of a state control method for a display screen according to an embodiment of the disclosure.

Referring to FIG. 7, an embodiment of the disclosure also provides a state control method for a display screen, which is applied to a terminal. The terminal is the terminal specified in the abovementioned embodiment. The terminal is provided with a first signal transmitter, a second signal transmitter and a signal receiver, and a distance between the first signal transmitter and the signal receiver is shorter than a distance between the second signal transmitter and the signal receiver. The state control method includes the following operations.

In S101, a current state of a display screen is acquired.

In S101, the current state of the display screen may be an off state or an on state. When the terminal monitors a triggering signal, the current state of the display screen is started to be acquired. When the current state of the display screen is the on state, it is indicated that a triggering condition is required to be monitored to turn off the screen, and if the triggering condition is not met, the screen is kept on. When the current state of the display screen is the off state, it is indicated that a triggering condition is required to be monitored to turn on the screen, and if the triggering condition is not met, the screen is kept off.

In S102, a corresponding signal transmitter in the first signal transmitter and the second signal transmitter is controlled according to the current state to transmit a detection signal, wherein the detection signal is reflected by a barrier to form a reflected signal.

In S102, when the current state of the display screen is the on state, the second signal transmitter is controlled to transmit a detection signal. To turn off the screen in the on state, the display screen is required to be close to the barrier, that is, the screen may be turned off only after the display screen is relatively close to the barrier. However, when the display screen is relatively close to the barrier, a low noise value detected by the signal receiver may be great if the first signal transmitter that is relatively close is turned on, so that an intensity value detected by the signal receiver in a short-distance state may change not so obviously, and detection sensitivity of the signal receiver is affected. Therefore, when detecting that the display screen is on, only the second signal transmitter is required to be turned on to transmit the detection signal, and the first signal transmitter is turned off.

When the current state of the display screen is the off state, the first signal transmitter and the second signal transmitter are controlled to simultaneously transmit detection signals. To turn on the screen in the off state, the display screen is required to be relatively distant from the barrier. However, when the display screen is relatively distant from the barrier, a reflected signal formed by the detection signal of the second signal transmitter that is relatively distant has become very weak when being received by the signal receiver, and the first signal transmitter is required to be simultaneously turned on.

In S103, a distance state between the terminal and the barrier is judged according to an intensity of the reflected signal received by the signal receiver.

In S103, an interval of an intensity value of the reflected signal is judged, and the distance state between the terminal and the barrier is judged according to the interval of the intensity value. For example, when the intensity value of the reflected signal is in a first interval, it is determined that the terminal and the barrier are in a near state; and when the intensity value of the reflected signal is in a second interval, it is determined that the terminal and the barrier are in a distant state. Herein, each value in the first interval is greater than each value in the second interval. For example, when the signal receiver is an 8-bit chip, a full range of the signal receiver is 256, the first interval is [100, 256], and the second interval is [1, 75].

In S104, the state of the display screen is controlled according to the distance state.

In S104, when the distance state is the near state, the display screen is controlled to be turned off; and when the distance state is the distant state, the display screen is controlled to be turned on.

Figure 8:
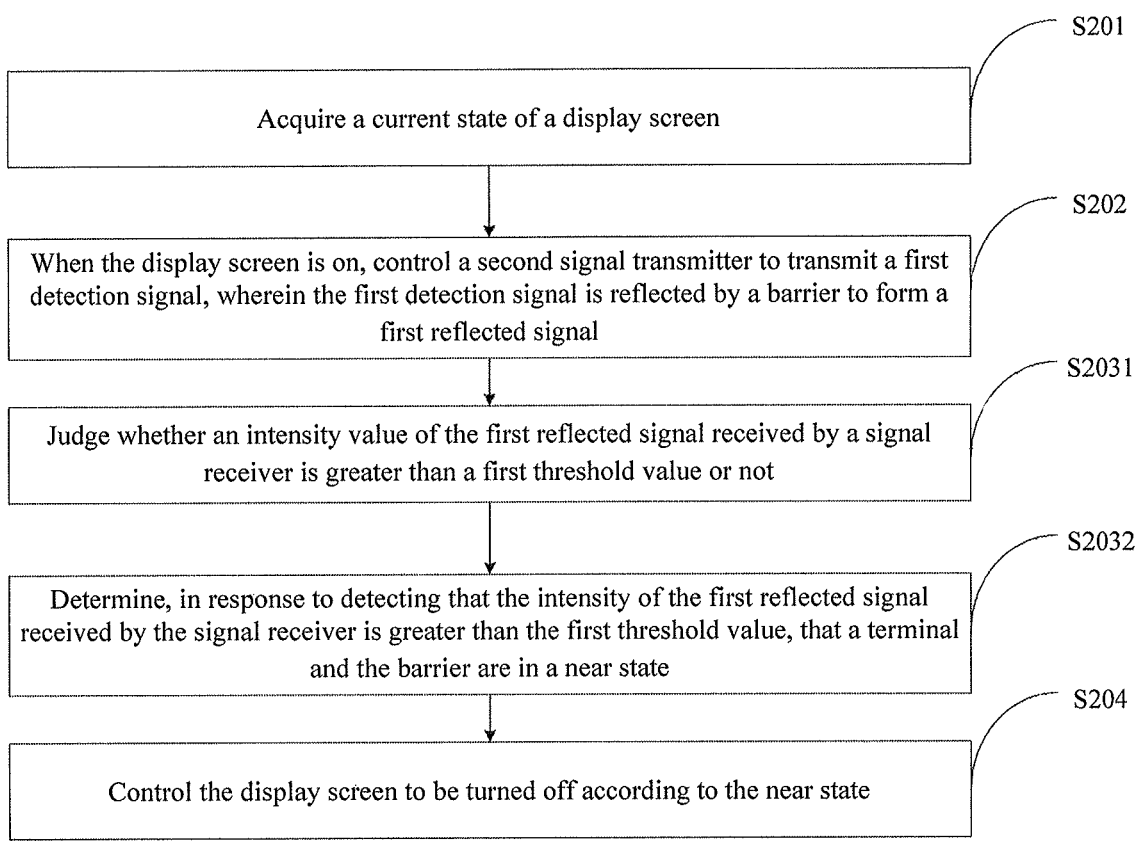
FIG. 8 is a second flowchart of a state control method for a display screen according to an embodiment of the disclosure.

FIG. 8 is a second flowchart of a state control method for a display screen according to an embodiment of the disclosure. The state control method is applied to a terminal, and the terminal is the terminal in the abovementioned embodiments. The terminal is provided with a first signal transmitter, a second signal transmitter and a signal receiver, and a distance between the first signal transmitter and the signal receiver is shorter than a distance between the second signal transmitter and the signal receiver. The state control method includes the following operations.

In S201, a current state of a display screen is acquired.

The current state of the display screen may be an off state or an on state. When the terminal monitors a triggering signal, the current state of the display screen is started to be acquired. When the current state of the display screen is the on state, it is indicated that a triggering condition is required to be monitored to turn off the screen, and if the triggering condition is not met, the screen is kept on. When the current state of the display screen is the off state, it is indicated that a triggering condition is required to be monitored to turn on the screen, and if the triggering condition is not met, the screen is kept off.

In S202, when the display screen is on, the second signal transmitter is controlled to transmit a first detection signal, wherein the first detection signal is reflected by a barrier to form a first reflected signal.

In S202, to turn off the screen in the on state, the display screen is required to be close to the barrier, that is, the screen may be turned off only after the display screen is relatively close to the barrier. However, when the display screen is relatively close to the barrier, a low noise value detected by the signal receiver may be great if the first signal transmitter that is relatively close is turned on, so that an intensity value detected by the signal receiver in a short-distance state may change not so obviously, and detection sensitivity of the signal receiver is affected. Therefore, when detecting that the display screen is on, only the second signal transmitter is required to be turned on to transmit the detection signal, and the first signal transmitter is turned off.

In S2031, whether an intensity value of the first reflected signal received by the signal receiver is greater than a first threshold value or not is judged.

In S2031, when a bit number of the signal receiver is 8, a full range of the signal receiver is 256, and the first threshold value may be set to be 100.

In S2032, it is determined, in response to detecting that the intensity of the first reflected signal received by the signal receiver is greater than the first threshold value, that the terminal and the barrier are in a near state.

In S2032, if the intensity value of the first reflected signal received by the signal receiver is greater than the first threshold value, it is determined that the terminal and the barrier are in the near state; and if an intensity of the first reflected signal received by the signal receiver is less than the first threshold value, it is indicated that the near state has yet not been reached, and the display screen is kept on.

In S204, the display screen is controlled to be turned off according to the near state.

When a distance state is the near state, it is indicated that the terminal is close to the barrier, and thus the display screen is controlled to be turned off.

Figure 9:
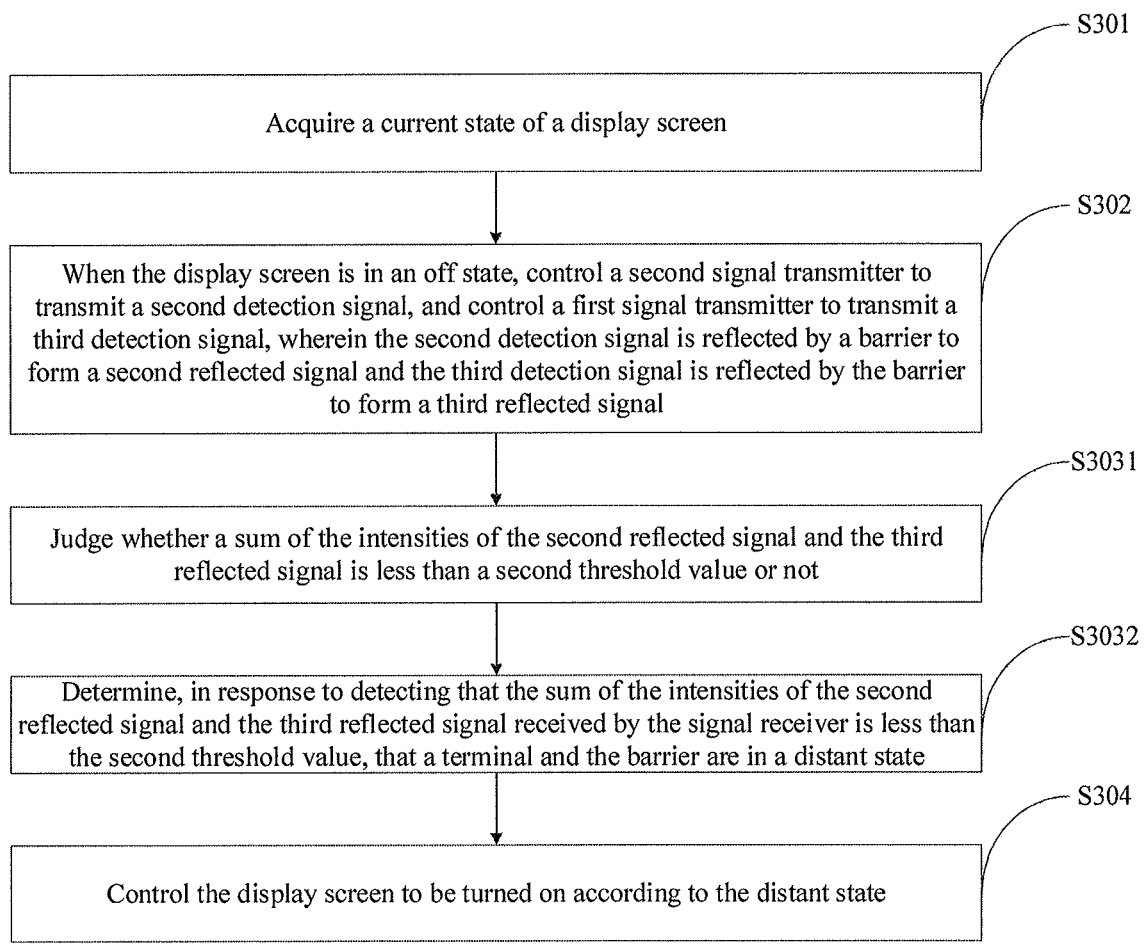
FIG. 9 is a third flowchart of a state control method for a display screen according to an embodiment of the disclosure.

Referring to FIG. 9, an embodiment of the disclosure also provides a state control method for a display screen, which is applied to a terminal, the terminal being the terminal in the abovementioned embodiments. The terminal is provided with a first signal transmitter, a second signal transmitter and a signal receiver, and a distance between the first signal transmitter and the signal receiver is shorter than a distance between the second signal transmitter and the signal receiver. The state control method includes the following operations.

In S301, a current state of a display screen is acquired.

The current state of the display screen may be an off state or an on state. When the terminal monitors a triggering signal, the current state of the display screen is started to be acquired. When the current state of the display screen is the on state, it is indicated that a triggering condition is required to be monitored to turn off the screen, and if the triggering condition is not met, the screen is kept on. When the current state of the display screen is the off state, it is indicated that a triggering condition is required to be monitored to turn on the screen, and if the triggering condition is not met, the screen is kept off.

In S302, when the display screen is in an off state, the second signal transmitter is controlled to transmit a second detection signal, and the first signal transmitter is controlled to transmit a third detection signal, wherein the second detection signal is reflected by a barrier to form a second reflected signal and the third detection signal is reflected by the barrier to form a third reflected signal.

In S302, to turn on the screen in the off state, the display screen is required to be distant from the barrier. However, when the display screen is relatively distant from the barrier, the reflected signal formed by the detection signal received by the second signal transmitter that is relatively distant has become very weak when being received by the signal receiver, and the first signal transmitter is required to be simultaneously turned on.

In S3031, whether a sum of the intensities of the second reflected signal and the third reflected signal is less than a second threshold value or not is judged.

When a bit number of the signal receiver is 8, a full range of the signal receiver is 256, and the second threshold value may be set to be 75.

In S3032, it is determined, in response to detecting that the sum of the intensities of the second reflected signal and the third reflected signal received by the signal receiver is less than the second threshold value, that the terminal and the barrier are in a distant state.

If the sum of the intensities of the second reflected signal and the third reflected signal received by the signal receiver is less than the second threshold value, it is determined that the terminal and the barrier are in the distant state; and if the sum of the intensities of the second reflected signal and the third reflected signal received by the signal receiver is greater than the second threshold value, it is indicated that they are still in a near state, and the display screen is kept off.

In S204, the display screen is controlled to be turned on according to the distant state.

When a distance state is the distant state, it is indicated that the terminal is distant from the barrier, and thus the display screen is controlled to be turned on.

From the above, it can be seen that, in the state control method for a display screen provided in the embodiments of the disclosure, the current state of the display screen is acquired; the corresponding signal transmitter in the first signal transmitter and the second signal transmitter is controlled according to the current state to transmit the detection signal, wherein the detection signal is reflected by the barrier to form the reflected signal; the distance state between the terminal and the barrier is judged according to the intensity of the reflected signal received by the signal receiver; and the state of the display screen is controlled according to the distance state, thereby completing control over the state of the display screen. According to the solution, the signal transmitter corresponding to the current state of the display screen may be turned on to transmit the detection signal, so that accuracy of control over the state of the display screen of the terminal may be improved.

Figure 10:
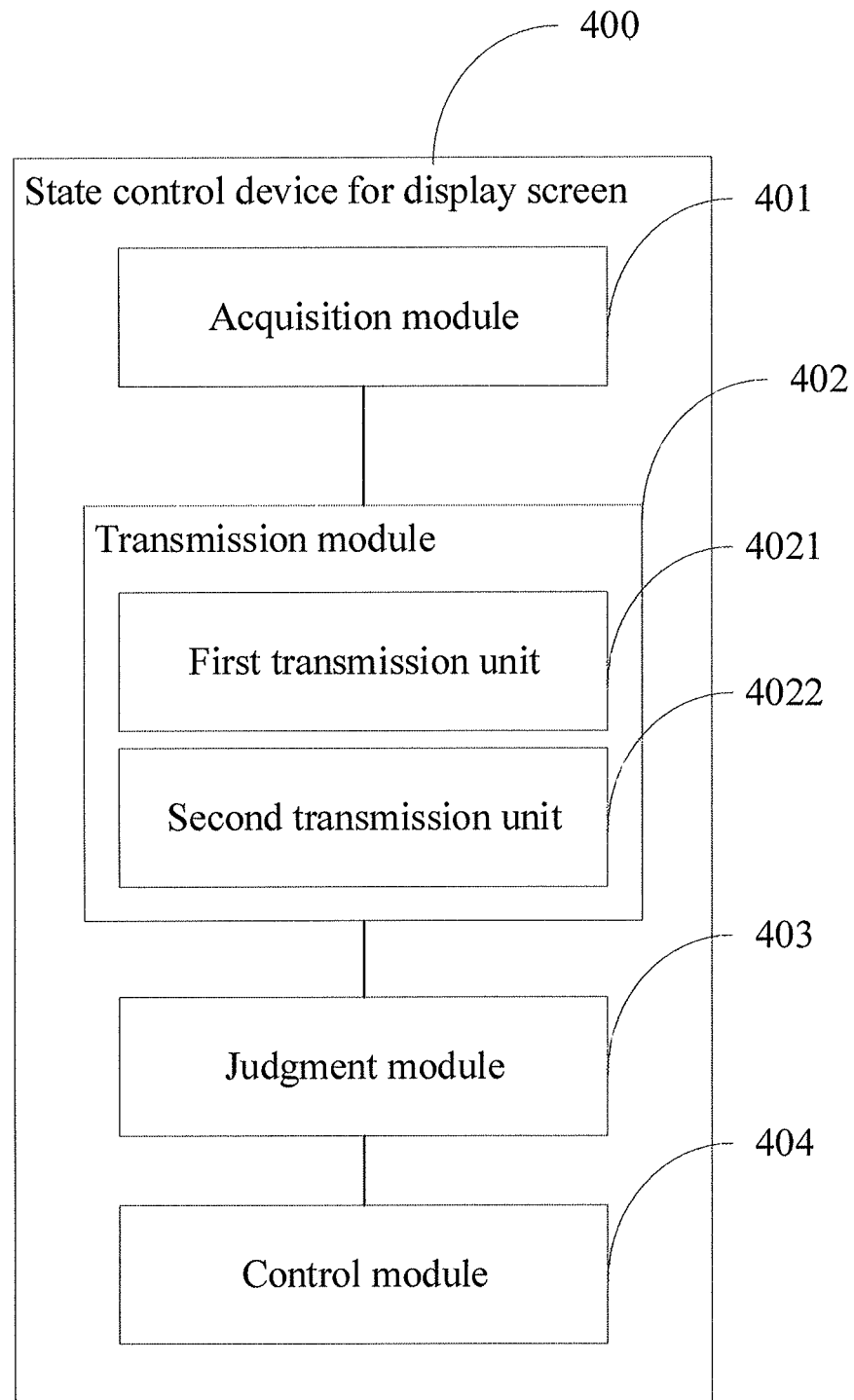
FIG. 10 is a structure diagram of a state control device for a display screen according to an embodiment of the disclosure.

Referring to FIG. 10, an embodiment of the disclosure provides a state control device for a display screen, which is applied to a terminal, the terminal being provided with a first signal transmitter, a second signal transmitter and a signal receiver and a distance between the second signal transmitter and the signal receiver being longer than a distance between the first signal transmitter and the signal receiver, the state control device including an acquisition module 401, a transmission module 402, a judgment module 403 and a control module 404.

Herein, the acquisition module 401 is configured to acquire a current state of a display screen.

The transmission module 402 is configured to control, according to the current state, a corresponding signal transmitter in the first signal transmitter and the second signal transmitter to transmit a detection signal, wherein the detection signal is reflected by a barrier to form a reflected signal. Herein, the transmission module 402 includes a first transmission unit 4021 and a second transmission unit 4022. The first transmission unit 4021 is configured to, when the display screen is in an on state, control the second signal transmitter to transmit a first detection signal, wherein the first detection signal is reflected by the barrier to form a first reflected signal. The second transmission unit 4022 is configured to, when the display screen is in an off state, control the second signal transmitter to transmit a second detection signal and control the first signal transmitter to transmit a third detection signal, wherein the second detection signal is reflected by the barrier to form a second reflected signal and the third detection signal is reflected by the barrier to form a third reflected signal.

The judgment module 403 is configured to judge a distance state between the terminal and the barrier according to an intensity of the reflected signal received by the signal receiver. During a practical application, the judgment module 403 may be configured to judge whether an intensity of the first reflected signal is greater than a first threshold value or not and determine, in response to detecting that the intensity of the first reflected signal received by the signal receiver is greater than the first threshold value, that the terminal and the barrier are in a near state. The judgment module 403 may further be configured to judge whether a sum of the intensities of the second reflected signal and the third reflected signal is less than a second threshold value or not and determine, in response to detecting that the sum of the intensities of the second reflected signal and the third reflected signal received by the signal receiver is less than the second threshold value, that the terminal and the barrier are in a distant state.

The control module 404 is configured to control the state of the display screen according to the distance state. During the practical application, the control module 404 may be configured to control the display screen to be turned on according to the distant state, and may further be configured to control the display screen to be turned off according to the near state.

In an implementation mode, the control module 404 may further be configured to set, in response to detecting that a bit number of the signal receiver is 8, a numerical value of the first threshold value to be 100.

In an implementation mode, the control module 404 may further be configured to set, in response to detecting that a bit number of the signal receiver is 8, a numerical value of the second threshold value to be 75.

An embodiment of the application provides a computer-readable storage medium, in which a computer program is stored, the computer program being executed on a computer to enable the computer to execute the operations in the state control method provided in the embodiments.

An embodiment of the application also provides an electronic device, which includes a memory and a processor and is provided with a first signal transmitter, a second signal transmitter and a signal receiver, a distance between the second signal transmitter and the signal receiver being longer than a distance between the first signal transmitter and the signal receiver and the processor calling the computer program stored in the memory to execute the operations in the state control method provided in the embodiments.

Figure 11:
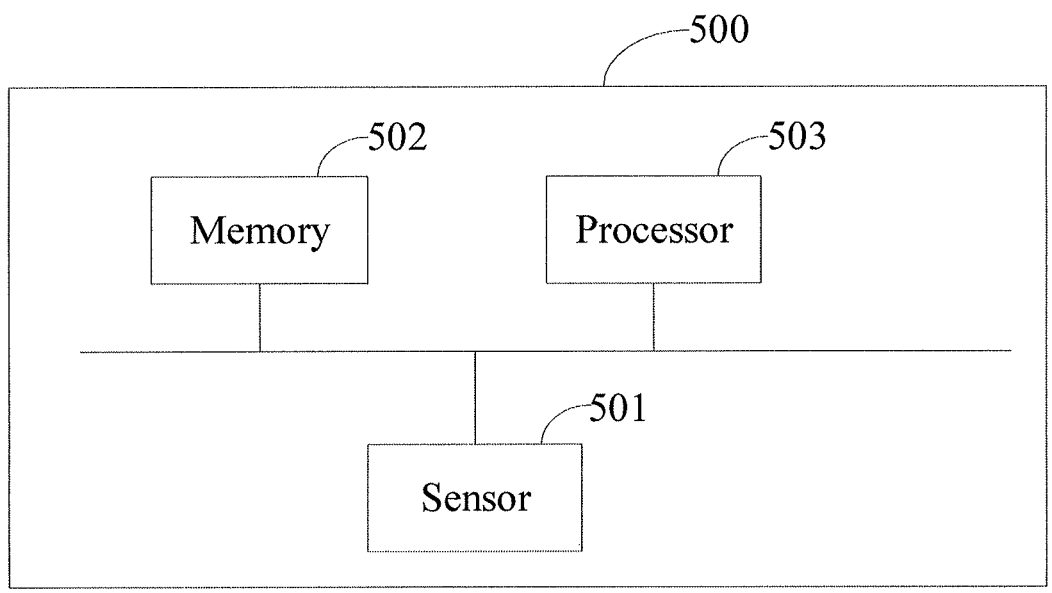
FIG. 11 is a structure diagram of an electronic device according to an embodiment of the disclosure.

For example, the electronic device may be an electronic device such as a tablet computer or a smart phone. Referring to FIG. 11, FIG. 11 is a structure diagram of an electronic device according to an embodiment of the application.

The electronic device 500 may include components such as a sensor 501, a memory 502 and a processor 503. Those skilled in the art can understand that the structure of the electronic device shown in FIG. 11 is not intended to form limits to the electronic device and may include components more or fewer than those shown in the figure, or some components may be combined or different component arrangements may be adopted.

The sensor 501 may include a distance sensor (infrared sensor), an ambient light sensor, a gyroscope sensor and the like.

The memory 502 may be configured to store application programs and data. The application programs stored in the memory 502 include executable codes. The application programs may form various function modules. The processor 503 runs the application programs stored in the memory 502, thereby executing various function applications or data processing.

The processor 503 is a control center of the electronic device, connects each portion of the whole electronic device by use of various interfaces and lines, and executes various functions and data processing of the electronic device by running or executing the application programs stored in the memory 502 and calling the data stored in the memory 502, thereby monitoring the whole electronic device.

In the embodiment, the processor 503 in the electronic device may load the executable codes corresponding to processes of one or more than one application program into the memory 502 according to the following instructions, and the processor 503 runs the application programs stored in the memory 502, thereby implementing the following operations:

a current state of a display screen is acquired; a corresponding signal transmitter in the first signal transmitter and the second signal transmitter is controlled according to the current state to transmit a detection signal, wherein the detection signal is reflected by a barrier to form a reflected signal; a distance state between the terminal and the barrier is judged according to an intensity of the reflected signal received by the signal receiver; and the state of the display screen is controlled according to the distance state.

Figure 12:
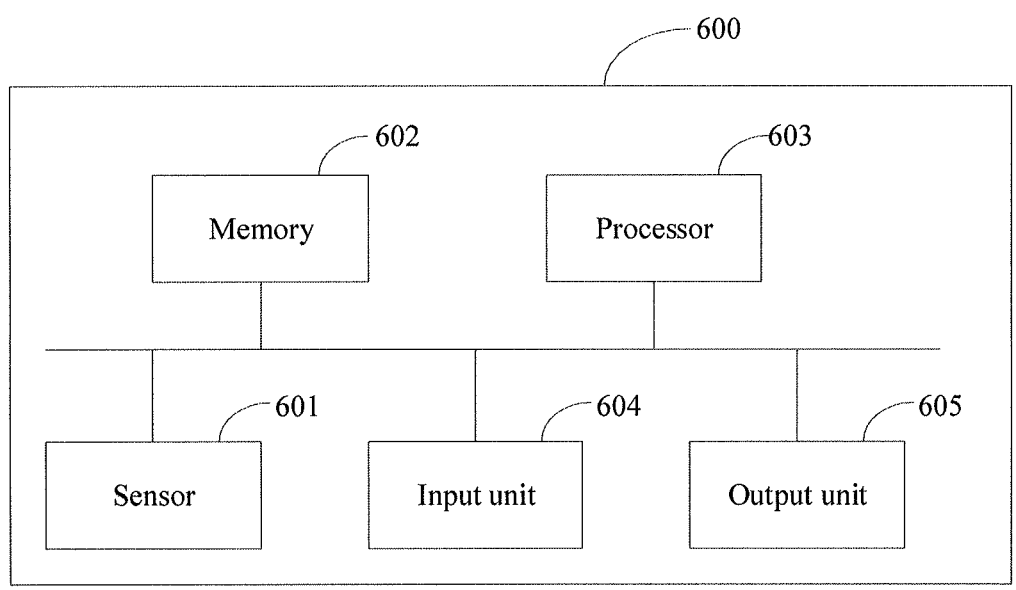
FIG. 12 is another structure diagram of an electronic device according to an embodiment of the disclosure.

Referring to FIG. 12, an electronic device 600 may include components such as a sensor 601, a memory 602, a processor 603, an input unit 604 and an output unit 605.

The sensor 601 may include a distance sensor (infrared sensor), an ambient light sensor, a gyroscope sensor and the like.

The memory 602 may be configured to store application programs and data. The application programs stored in the memory 602 include executable codes. The application programs may form various function modules. The processor 603 runs the application programs stored in the memory 602, thereby executing various function applications or data processing.

The processor 603 is a control center of the electronic device, connects each portion of the whole electronic device by use of various interfaces and lines, and executes various functions and data processing of the electronic device by running or executing the application programs stored in the memory 602 and calling the data stored in the memory 502, thereby monitoring the whole electronic device.

The input unit 604 may be configured to receive input digital and character information or user feature information (for example, a fingerprint) and generate keyboard, mouse, joystick, optical or trackball signal input related to user setting and function control.

The output unit 605 may be configured to display information input by a user or information provided for the user and various graphical user interfaces of the electronic device. These graphical user interfaces may be formed by graphs, texts, icons, videos and any combination thereof. The output unit may include a display panel.

In the embodiment, the processor 603 in the electronic device may load the executable codes corresponding to processes of one or more than one application program into the memory 602 according to the following instructions, and the processor 603 runs the application programs stored in the memory 602, thereby implementing the following operations:

a current state of a display screen is acquired; a corresponding signal transmitter in a first signal transmitter and a second signal transmitter is controlled according to the current state to transmit a detection signal, wherein the detection signal is reflected by a barrier to form a reflected signal; a distance state between the electronic device and the barrier is judged according to an intensity of the reflected signal received by a signal receiver; and the state of the display screen is controlled according to the distance state.

In an implementation mode, the processor 603, when executing the operation that the corresponding signal transmitter in the first signal transmitter and the second signal transmitter is controlled according to the current state to transmit the detection signal, wherein the detection signal is reflected by the barrier to form the reflected signal, may execute the following operation: when the display screen is in an on state, the second signal transmitter is controlled to transmit a first detection signal, wherein the first detection signal is reflected by the barrier to form a first reflected signal.

Correspondingly, the processor 603, when executing the operation that the distance state between the electronic device and the barrier is judged according to the intensity of the reflected signal received by the signal receiver, may execute the following operation: the distance state between the electronic device and the barrier is judged according to an intensity of the first reflected signal received by the signal receiver.

In an implementation mode, the processor 603, when executing the operation that the distance state between the electronic device and the barrier is judged according to the intensity of the first reflected signal received by the signal receiver, may execute the following operations: whether the intensity of the first reflected signal received by the signal receiver is greater than a first threshold value or not is judged; and it is determined, in response to detecting that the intensity of the first reflected signal received by the signal receiver is greater than the first threshold value, that the electronic device and the barrier are in a near state.

Correspondingly, the processor 603, when executing the operation that the state of the display screen is controlled according to the distance state, may execute the following operation: the display screen is controlled to be turned off according to the near state.

In an implementation mode, the processor 603, when executing the operation that the corresponding signal transmitter in the first signal transmitter and the second signal transmitter is controlled according to the current state to transmit the detection signal, wherein the detection signal is reflected by the barrier to form the reflected signal, may execute the following operation: when the display screen is in an off state, the second signal transmitter is controlled to transmit a second detection signal, and the first signal transmitter is controlled to transmit a third detection signal, wherein the second detection signal is reflected by the barrier to form a second reflected signal and the third detection signal is reflected by the barrier to form a third reflected signal.

Correspondingly, the processor 603, when executing the operation that the distance state between the terminal and the barrier is judged according to the intensity of the reflected signal received by the signal receiver, may execute the following operation: the distance state between the electronic device and the barrier is judged according to intensities of the second reflected signal and the third reflected signal received by the signal receiver.

In an implementation mode, the processor 603, when executing the operation that the distance state between the terminal and the barrier is judged according to the intensities of the second reflected signal and the third reflected signal received by the signal receiver, may execute the following operations: whether a sum of the intensities of the second reflected signal and the third reflected signal received by the signal receiver is less than a second threshold value or not is judged; and it is determined, in response to detecting that the sum of the intensities of the second reflected signal and the third reflected signal received by the signal receiver is less than the second threshold value, that the electronic device and the barrier are in a distant state.

Correspondingly, the processor 603, when executing the operation that the state of the display screen is controlled according to the distance state, may execute the following operation: the display screen is controlled to be turned on according to the distant state.

In an implementation mode, the processor 603 may further execute the following operation: a numerical value of the first threshold value is set to be 100 in response to detecting that a bit number of the signal receiver is 8.

In an implementation mode, the processor 603 may further execute the following operation: a numerical value of the second threshold value is set to be 75 in response to detecting that a bit number of the signal receiver is 8.

In the description of the specification, descriptions made with reference to terms "an implementation mode", "some implementation modes", "schematic implementation mode", "example", "specific example", "some examples" or the like mean that specific features, structures, materials or characteristics described in combination with the implementation modes or the examples are included in at least one implementation mode or example of the disclosure. In the specification, schematic expressions of these terms do not always refer to the same implementation mode or example. Moreover, the described specific features, structures, materials or characteristics may be properly combined in any one or more implementation modes or examples.

From the above, the embodiments of the disclosure are disclosed above but not intended to limit the disclosure. Those of ordinary skill in the art may make various modifications and embellishments without departing from the spirit and scope of the disclosure. Therefore, the scope of protection of the disclosure is subject to the scope defined by the claims.

What is claimed is:

1. A state control method for a display screen, wherein the state control method is applied to a terminal provided with a first signal transmitter, a second signal transmitter and a signal receiver, a distance between the second signal transmitter and the signal receiver being longer than a distance between the first signal transmitter and the signal receiver, and the state control method comprises:

acquiring a current state of a display screen, wherein the current state is an on state or an off state;

when the display screen is in the off state, controlling the second signal transmitter to transmit a second detection signal, and controlling the first signal transmitter to transmit a third detection signal, wherein the second detection signal is reflected by a barrier to form a second reflected signal and the third detection signal is reflected by the barrier to form a third reflected signal;

judging a distance state between the terminal and the barrier according to intensities of the second reflected signal and the third reflected signal received by the signal receiver; and controlling the state of the display screen according to the distance state.

2. The state control method for the display screen as claimed in claim 1, further comprising:

when the display screen is in the on state, controlling the second signal transmitter to transmit a first detection signal, wherein the first detection signal is reflected by the barrier to form a first reflected signal; and judging the distance state between the terminal and the barrier according to an intensity of the first reflected signal received by the signal receiver.

3. The state control method for the display screen as claimed in claim 2, wherein judging the distance state between the terminal and the barrier according to the intensity of the first reflected signal received by the signal receiver comprises:

judging whether the intensity of the first reflected signal received by the signal receiver is greater than a first threshold value or not, and determining, in response to detecting that the intensity of the first reflected signal received by the signal receiver is greater than the first threshold value, that the terminal and the barrier are in a near state; and controlling the state of the display screen according to the distance state comprises:

controlling the display screen to be turned off according to the near state.

4. The state control method for the display screen as claimed in claim 3, further comprising:

setting, in response to detecting that a bit number of the signal receiver is 8, a numerical value of the first threshold value to be 100.

5. The state control method for the display screen as claimed in claim 1, wherein judging the distance state between the terminal and the barrier according to the intensities of the second reflected signal and the third reflected signal received by the signal receiver comprises:

judging whether a sum of the intensities of the second reflected signal and the third reflected signal received by the signal receiver is less than a second threshold value or not, and determining, in response to detecting that the sum of the intensities of the second reflected signal and the third reflected signal received by the signal receiver is less than the second threshold value, that the terminal and the barrier are in a distant state; and controlling the state of the display screen according to the distance state comprises:

controlling the display screen to be turned on according to the distant state.

6. The state control method for the display screen as claimed in claim 5, further comprising:

setting, in response to detecting that a bit number of the signal receiver is 8, a numerical value of the second threshold value to be 75.

7. A non-transitory storage medium, in which a computer program is stored, which, when executed on a computer, to enables the computer to execute the state control method as claimed in claim 1.

8. A non-transitory storage medium, in which a computer program is stored, which, when executed on a computer, to enables the computer to execute the state control method as claimed in claim 5.

9. A state control device for the display screen, wherein the state control device is applied to a terminal provided with a first signal transmitter, a second signal transmitter and a signal receiver, a distance between the second signal transmitter and the signal receiver being longer than a distance between the first signal transmitter and the signal receiver, and the state control device comprises:

at least one processor; and a computer readable storage medium, coupled to the at least one processor and storing at least one computer executable instructions which, when being executed by the at least one processor, cause the at least one processor to carry out following program modules:

an acquisition module, configured to acquire a current state of a display screen, wherein the current state is an on state or an off state;

a transmission module, comprising a second transmission unit configured to, when the display screen is in the off state, control the second signal transmitter to transmit a second detection signal and control the first signal transmitter to transmit a third detection signal, wherein the second detection signal is reflected by a barrier to form a second reflected signal and the third detection signal is reflected by the barrier to form a third reflected signal;

a judgment module, configured to judge a distance state between the terminal and the barrier according to intensities of the second reflected signal and the third reflected signal received by the signal receiver; and a control module, configured to control the state of the display screen according to the distance state.

10. The state control device for the display screen as claimed in claim 9, wherein the transmission module further comprises:

a first transmission unit, configured to, when the display screen is in the on state, control the second signal transmitter to transmit a first detection signal, wherein the first detection signal is reflected by the barrier to form a first reflected signal; and the judgment module is configured to judge the distance state between the terminal and the barrier according to an intensity of the first reflected signal received by the signal receiver.

11. The state control device for the display screen as claimed in claim 10, wherein the judgment module is configured to judge whether the intensity of the first reflected signal received by the signal receiver is greater than a first threshold value or not and determine, in response to detecting that the intensity of the first reflected signal received by the signal receiver is greater than the first threshold value, that the terminal and the barrier are in a near state; and the control module is configured to control the display screen to be turned off according to the near state.

12. The state control device for the display screen as claimed in claim 11, wherein a numerical value of the first threshold value is set to be 100 in response to detecting that a bit number of the signal receiver is 8.

13. The state control device for the display screen as claimed in claim 9, wherein the judgment module is configured to judge whether a sum of the intensities of the second reflected signal and the third reflected signal received by the signal receiver is less than a second threshold value or not and determine, in response to detecting that the sum of the intensities of the second reflected signal and the third reflected signal received by the signal receiver is less than the second threshold value, that the terminal and the barrier are in a distant state; and the control module is configured to control the display screen to be turned on according to the distant state.

14. The state control device for the display screen as claimed in claim 13, wherein a numerical value of the second threshold value is set to be 75 in response to detecting that a bit number of the signal receiver is 8.

15. An electronic device, comprising a memory and a processor and being provided with a first signal transmitter, a second signal transmitter and a signal receiver, a distance between the second signal transmitter and the signal receiver being longer than a distance between the first signal transmitter and the signal receiver, wherein the processor calls the computer program stored in the memory to execute the following operations:

acquiring a current state of a display screen, wherein the current state is an on state or an off state;

when the display screen is in the off state, controlling the second signal transmitter to transmit a second detection signal, and controlling the first signal transmitter to transmit a third detection signal, wherein the second detection signal is reflected by a barrier to form a second reflected signal and the third detection signal is reflected by the barrier to form a third reflected signal;

judging a distance state between the terminal and the barrier according to intensities of the second reflected signal and the third reflected signal received by the signal receiver; and controlling the state of the display screen according to the distance state.

16. The electronic device as claimed in claim 15, wherein the processor calls the computer program stored in the memory to execute the following operations:

when the display screen is in the on state, controlling the second signal transmitter to transmit a first detection signal, wherein the first detection signal is reflected by the barrier to form a first reflected signal; and judging the distance state between the electronic device and the barrier according to an intensity of the first reflected signal received by the signal receiver.

17. The electronic device as claimed in claim 16, wherein the processor calls the computer program stored in the memory to execute the following operations:

judging whether the intensity of the first reflected signal received by the signal receiver is greater than a first threshold value or not;

determining, in response to detecting that the intensity of the first reflected signal received by the signal receiver is greater than the first threshold value, that the electronic device and the barrier are in a near state; and controlling the display screen to be turned off according to the near state.

18. The electronic device as claimed in claim 15, wherein the processor calls the computer program stored in the memory to execute the following operations:

judging whether a sum of the intensities of the second reflected signal and the third reflected signal received by the signal receiver is less than a second threshold value or not;

determining, in response to detecting that the sum of the intensities of the second reflected signal and the third reflected signal received by the signal receiver is less than the second threshold value, that the electronic device and the barrier are in a distant state; and controlling the display screen to be turned on according to the distant state.

19. The electronic device as claimed in claim 18, wherein the processor calls the computer program stored in the memory to execute the following operation:

setting, in response to detecting that a bit number of the signal receiver is 8, a numerical value of the second threshold value to be 75.

20. The electronic device as claimed in claim 17, wherein the processor calls the computer program stored in the memory to execute the following operation:

setting, in response to detecting that a bit number of the signal receiver is 8, a numerical value of the first threshold value to be 100.

* * * * *